(12) United States Patent
Hickie

(10) Patent No.: US 8,798,579 B2
(45) Date of Patent: *Aug. 5, 2014

(54) SYSTEM AND METHOD FOR SECURE MANAGEMENT OF MOBILE USER ACCESS TO NETWORK RESOURCES

(71) Applicant: XE2 Ltd., Surrey (GB)

(72) Inventor: Thomas William Hickie, Ottawa (CA)

(73) Assignee: XE2 Ltd., Surrey (GB)

( * ) Notice: Subject to any disclaimer, the term of this patent is extended or adjusted under 35 U.S.C. 154(b) by 11 days.

This patent is subject to a terminal disclaimer.

(21) Appl. No.: 13/625,438

(22) Filed: Sep. 24, 2012

(65) Prior Publication Data

US 2013/0029641 A1    Jan. 31, 2013

Related U.S. Application Data

(63) Continuation-in-part of application No. 12/488,959, filed on Jun. 22, 2009, now Pat. No. 8,275,356, which is a continuation-in-part of application No. PCT/CA2008/001704, filed on Sep. 30, 2008.

(51) Int. Cl.
H04M 1/66 (2006.01)
H04M 1/68 (2006.01)
H04M 3/16 (2006.01)

(52) U.S. Cl.
USPC ............... 455/410; 455/411; 726/2; 726/15; 726/26; 726/27

(58) Field of Classification Search
None
See application file for complete search history.

(56) References Cited

U.S. PATENT DOCUMENTS

| | | |
|---|---|---|
| 5,287,472 A | 2/1994 | Horst |
| 5,604,490 A | 2/1997 | Blakley et al. |
| 6,873,840 B1 | 3/2005 | von Alten |
| 6,990,527 B2 | 1/2006 | Spicer et al. |
| 7,461,158 B2 | 12/2008 | Rider et al. |
| 2006/0293034 A1 | 12/2006 | Armstrong |
| 2007/0136798 A1 | 6/2007 | Fitzgerald et al. |
| 2008/0025243 A1 | 1/2008 | Corneille et al. |
| 2008/0172366 A1 | 7/2008 | Hannel et al. |
| 2008/0176540 A1 | 7/2008 | Khedouri et al. |
| 2009/0049200 A1 | 2/2009 | Lin et al. |
| 2009/0077327 A1 | 3/2009 | Hara |
| 2009/0239512 A1 | 9/2009 | Hammad et al. |
| 2009/0298470 A1 | 12/2009 | Huber et al. |
| 2009/0328180 A1 | 12/2009 | Coles et al. |
| 2010/0049968 A1 | 2/2010 | Dimitrakos et al. |

Primary Examiner — Magdi Elhag
(74) Attorney, Agent, or Firm — Hiscock & Barclay, LLP

(57) ABSTRACT

A client-server system and method is provided for secure management of mobile user access to network resources from a wireless mobile device, such as a smart phone. A mobile access control layer resides between a wireless service provider network and host network, allowing for management of mobile access without overriding internal access policies. Access rules determining accessible resources and permitted operations are determined based on a user's group memberships, and optionally on other information received from the system, or from the mobile device, e.g. time or location. Each group is associated with a set of permitted accessible resources and operations, e.g. read or write access to a resource such as a file, list, shared calendar, et al. A list of accessible resources and permitted operations is generated, and the list is made available for subsequent processes, e.g. presented to the user for selection of an accessible resource and permitted operation.

37 Claims, 8 Drawing Sheets

SYSTEM AND METHOD FOR SECURE MANAGEMENT OF MOBILE USER ACCESS TO NETWORK RESOURCES

CROSS-REFERENCE TO RELATED APPLICATIONS

This application is a continuation-in-part of U.S. patent application Ser. No. 12/488,959, filed 22 Jun. 2009, which is a continuation-in-part of PCT application No. PCT/CA2008/001704 designating the United States, filed Sep. 30, 2008. The contents of both applications are incorporated herein by reference, in their entirety.

TECHNICAL FIELD

This invention relates to systems and methods for managing mobile user access to network resources in a secure manner, and particularly relates to management of user access to resources in an enterprise network (intranet) from wireless mobile devices, such as smart phones, PDAs and other handheld devices, or mobile computers.

BACKGROUND

With increasingly mobile workforces, there has been a rapid proliferation in the use of mobile wireless handheld devices, such as Blackberry™, iPhone™ and other smart phones, for both voice communications and email communications.

Although smart phones are widely used for access to corporate email, which is one of the most common business tasks, current interfaces provide limited, if any, access to internal corporate file systems and other document storage resources within an organization's corporate network (intranet).

For example, although a Blackberry user can view email and attachments stored in the user's Blackberry inbox, the user will not be able to view documents located in the office, e.g. stored on a file server, and a user cannot access such a document to attach and email via a Blackberry or other mobile wireless handheld device. Users receiving an email containing a link to a document stored within a corporate network are not able to access that document on their handheld device. There may also be limitations on viewing email attachments in a convenient format on a small screen. Moreover, since access is provided only to information stored in the user's mail box, when a user needs an email message or attachment which is older than a default storage limit, typically 6 months, very often it is not still in the user's Blackberry inbox.

Access to a data network or host network, such as a secure enterprise network by mobile users may also be restricted, or not be permitted, for business and security reasons.

For good reason, many organizations are concerned about security of wireless communications "over the air", and do not permit remote or mobile access to a secure corporate network (intranet), except through a secure channel or tunnel, such as provided by a conventional virtual private network (VPN). Organizations may restrict access from mobile devices and/or require employees and authorized users to use only approved enterprise enabled wireless hand handheld devices, e.g. a Blackberry or smart phone which connects to a Blackberry Enterprise Server (BES) managed within the corporate network, and which provides appropriate security and access controls specifically for voice and email services.

There are certain unique security concerns inherent in a mobile wireless operating environment.
- Data travels over shared, public and sometimes open networks
- Mobile handhelds may be misplaced or stolen, exposing sensitive information
- A mobile device represents a potentially unmanaged point-of-entry into the network.
- Worms and viruses may be transferred to a corporate internal network via tunnels created using mobile VPN technology.

Remote wireless access to an enterprise network from a handheld or a laptop, or downloading of information to a mobile device may be undesirable, or not permissible for other legal or security reasons, e.g. where there is cross-border restriction on information transfer, export controls, or regional differences in compliance with privacy laws or other regulatory requirements.

Users working remotely and/or travelling with a laptop, and requiring secure access to a corporate network to retrieve documents or information, typically need to find access to the interne (e.g. via a suitable wired connection or wireless access point), and then are required to set up a secure link to the corporate network (intranet) e.g. through a conventional VPN. For security reasons, enterprises managing such a computer network restrict access to network resources only to authorised users within the network, or users logged on through a secure link or tunnel such as a VPN, which require appropriate authentication of the user. When the user has access to the intranet via a conventional VPN gateway, access policies may be applied to manage access to permitted resources. Each user, e.g. employees or other authorized users, may therefore be provided with different access privileges associated with each of the various types of resources within a corporate network, e.g. an email server (Exchange server), an application server (e.g. SharePoint); file storage (servers, WebDAV). However, wireless mobile users cannot access various types of network resources in this manner.

Indeed, many organizations seek a way to restrict or expose only certain resources to mobile devices. For example, an organization may not wish to present or make accessible the same resources that would be accessible via a desktop, or laptop on a VPN, but would rather present only a subset of these resources to mobile users.

However, existing systems do not provide an appropriate interface for managing secure access to enterprise resources of these different types via a smart phone or other wireless mobile device, and mobile devices do not currently provide a way of getting a list of different accessible resources within an existing network.

Consequently, although a mobile user may access email and files received by email as email attachments, a user of a mobile device, such as a Blackberry, smart phone or other PDA or mobile computer or communications device connected to a wireless communications network, i.e. via a service provider cellular phone/data network, has been unable to directly access other enterprise network resources to retrieve data files. Thus, a mobile user has not been able to access document repositories, such as SharePoint, or even open a link within an email to download documents from a file server. Often, a mobile user may have to resort to contacting the office by phone or email to have someone access documents which are stored on a secure corporate network (intranet) and arrange to have the documents delivered to them, e.g. by fax or email. For users working across time zones, the need to contact someone back at the office to obtain documents or information may result in time delays, or perhaps an inconvenient wait until the next business day for a response.

Thus, it is desirable to enable access to other network resources via a mobile device with appropriate management of security.

More recently, where limited security or functionality is acceptable, several companies have proposed solutions that attempt to overcome some aspects of the above-mentioned problems. These include, for example, Pocket VPN™ by WICKSoft™, RepliGo™ by Cerienc Inc. and Cortado, a division of ThinPrint GmbH. Pocket VPN provides mobile access for text viewing of documents on Windows file servers; Cortado provides access to documents on Windows file servers only, by providing authorized users with access to files on a designated corporate drive in their corporate network (i.e. Bob sees documents on X: drive, and Susan sees Z: drive) for viewing, printing, or faxing of documents without need for download. RepliGo provides document conversion and management which is primarily directed to facilitating viewing and access to documents on mobile devices, and printing. Document access is managed by designating shared folders for access by authorized users. However, filters are not provided and thus all authorized users see all of the shared folders on the network and can view all files. The latter solutions may, therefore, bypass or override security policies which exist within an enterprise network, putting sensitive information at risk. On the other hand, in other solutions, access may be unnecessarily restricted to resources that are not supported or made accessible by the limited scope of functionality of the specific application.

Thus, these solutions do not provide a network administrator or IT manager with a desired or appropriate level of control of access policy for individual users of wireless mobile devices, and which is compatible with a wide range of network infrastructures. Known solutions also do not provide mobile users with a convenient way of accessing a listing of available resources as they would be able to do when logged on with intranet access to their internal enterprise network.

Therefore, improved or alternative solutions are desirable to overcome the limitations of current wireless handheld devices, systems and methods for accessing network resources in a secure manner, and to facilitate remote working in an enterprise environment requiring an acceptable and appropriate level of security.

The present invention seeks to overcome, or ameliorate, one or more of the above-mentioned disadvantages, or at least provide an alternative.

SUMMARY

Aspects of the invention provide systems and methods for secure management of mobile user access to network resources. Accordingly, also provided is a computer readable medium storing instructions for implementing steps of the method.

As disclosed in related applications, a system and method is provided for managing user access from a wireless mobile device to a plurality of network resources comprising documents and files within an enterprise network, wherein the enterprise network comprises a security infrastructure for managing internal user access from within the enterprise network according to an internal access policy, and wherein for access from a wireless mobile user device the method comprises the steps of: determining group membership of a user based on a user ID and attributes of the user, each group having associated therewith a set of resources and associated operations for members of the group; determining access rules for the user based on each group membership of the user; generating a list of accessible resources and associated operations for the user based on said access rules; making said list available to a subsequent process for performing an operation on an accessible resource in accordance with said access rules comprising one or more of displaying and otherwise interfacing said resource to the user for one or more of read, write, execute, modify, delete, email, download, and synchronize operations.

An aspect of the present invention provides a method for managing secure mobile user access from a wireless mobile device via a wireless service provider network to a plurality of network resources of a host network, by steps comprising: in an access server comprising a mobile access control layer between the wireless service provider network and the host network, receiving, from a client of the wireless mobile device, a user request for mobile access; authenticating the user; determining group membership of the user based on a user ID and attributes of the user, each group having associated therewith a set of resources and associated operations for members of the group; determining access rules for the user based on each group membership of the user; generating a list of accessible resources and associated operations for the user based on said access rules; making said list available to a subsequent process for performing an operation on an accessible resource in accordance with said access rules, said operations on an accessible resource comprising one or more of displaying and otherwise interfacing said resource to the user for one or more of read, write, execute, modify, delete, email, download and synchronize operations.

Another aspect of the invention provides a client-server system for managing secure mobile user access from a wireless mobile device through a wireless service provider network to a plurality of network resources of a host network, the system comprising: an access server providing a mobile access control layer between the wireless service provider network and the host network, and a mobile access client residing on the user's wireless mobile device; wherein the mobile access control layer is configured to perform the steps of: receiving, from the mobile access client, a user request for mobile access; authenticating the user; determining group membership of a user based on a user ID and attributes of the user, each group having associated therewith a set of resources and associated operations for members of the group; determining access rules for the user based on each group membership of the user; generating a list of accessible resources and associated operations for the user based on said access rules; making said list available to a subsequent process for performing an operation on an accessible resource in accordance with said access rules.

Performing an operation on an accessible resource may comprise one or more of displaying and otherwise interfacing said resource to the user for one or more of read, write, execute, modify, delete, email and download. Performing an operation may comprise synchronizing accessible resources with the mobile device.

Network resources may comprise network resources of different resource types, and the list of accessible resources and operations may comprise accessible resources of a plurality of different resource types. The list of accessible resources may comprise an indication or description of the resource type.

When multiple directory types and systems are supported, the method may comprise, before retrieving directory information, determining an applicable directory type of a set of possible directory types, and, after retrieving said directory information, re-encoding said information to a desired or common standardized format.

Authenticating the user may comprise an initial step of receiving from a user credentials comprising a user ID, and retrieving directory information associated with said user to obtain attributes of the user associated with said user ID.

The mobile access control layer may be configured to perform the step of delivering the list of accessible resources and operations to the mobile access client. The mobile access client may be configured to perform the step of presenting on a user interface of the wireless mobile device, said list of accessible resources of one or more resource types and permissible operations, and to receive a user request for performing a selected operation on a selected accessible resource.

The client-server system may be configured for operation with a wireless mobile device comprising one of a Blackberry device, an iPhone or other smart phone, running a mobile operating system comprising one of Blackberry OS, iOS, Android or other mobile operating system. The wireless service provider network may comprise a cellular voice and data network, or a WiFi network.

Thus, a system and method is provided for an organization to manage user access to network resources from a user's mobile device, with improved security and/or control, based on access rules, which determine who may access what resources, and how. In preferred embodiments, rules comprise membership lists which determine membership of one or more groups, and resource/operations lists which provide high level descriptors of resources deemed accessible, and associated permitted operations associated with each group membership.

Group based allocation and management of access privileges for network resources from mobile devices facilitates set up by an enterprise IT manager and allows access privileges to be rapidly set for large numbers of employees. Access privileges for remote access by mobile devices are managed independently of, or separately from, internal security policies, and since they reside in a layer between the access server and the mobile device, they may be set up so as not to override internal network access policies.

Access rules comprise high level descriptors of one or more of a membership group, a resource, and an associated operation, and may include a membership list and a resource/ operations list comprising said descriptors. The membership list may comprise a high level descriptor defining criteria for who may access associated resources and operations.

In an embodiment, Mobile Documents middleware may run on a dedicated server (Mobile Documents server) within the enterprise network, or in a virtual environment, e.g. as part of an existing BES or other mail server, or as a distributed system on multiple servers for load balancing or load sharing.

In summary, preferred embodiments provide a readily implemented client-server architecture for: authenticating a user of the mobile device for access to resources on an enterprise network; determining membership groups of the authenticated user based on directory information; looking up rules associated with each of said membership groups to determine which network resources may be accessed by members of said groups from a mobile device, and what actions or operations are permissible for those resources; making available to the authenticated user, or other processes, a list, or index, of (accessible) network resources and (permitted) associated operations; responding to user requests for access to one or more of said resources in accordance with said rules.

Embodiments of the invention provide that administrators must explicitly set rules that allow network resources to be made available to end users. In this way, the risk of accidentally exposing sensitive resources is mitigated. Furthermore, since implementation of the appropriate Mobile Documents access control layers does not require any changes to existing network security infrastructure, security for mobile user access is implemented in addition to any existing corporate security policies, and does not override existing security policies.

Also provided is a client on the mobile device for presenting or displaying a list of accessible resources and operations, e.g. via a graphical, audible or tactile user interface, and receiving user input for initiating a process to performing a permissible operation on an accessible resource.

Thus, a method is provided by which a mobile device is presented with a list of resources and systems that exist within an existing computer network, and associated operations or actions that a mobile user may perform.

For example, a client on a mobile user device provides a suitable user interface, typically a graphical interface, for presenting a list or index of accessible resources to the mobile user. Resources may be resources of multiple different types to which the user has access, e.g. directories, files, lists. Each resource is associated with permitted operations for the user of the handheld device, which may be time and location dependent. On selecting a desired resource, available operations may e.g. be presented to the user in the form of a pull down menu, offering choices of available operations, such as save/download, open/view, edit, copy, et al., as is conventional. Permitted operations may include synchronizing accessible resources with the mobile device.

Systems and methods according to aspects of the present invention provide for managing access to enterprise network resources from a wireless mobile device, such as a Blackberry, iPhone or other smart phone, or other wireless mobile computer device with an enhanced level of security management and access control. Access (publishing) rules determining accessible resources and associated permitted operations are determined based on membership of an authenticated user to each of one or more groups, each group being associated with rules which determine a set of permitted accessible resources and operations. Rules comprise high level descriptors of network resources and associated operations for users having a membership of a group. For each user, rules are applied based on membership of one or more groups. A Boolean evaluation of rules associated with memberships of two or more groups may be performed. Thus, a list or index of accessible resources and permitted operations is generated, and the list is made available for presentation to the user on an interface of the mobile device. Access rules may also be made dependent on other information received from the system, or from the mobile device, such as date, time or location. Requests for an operation may include e.g., read access or write access, to a network resource such as a file, contact list, Exchange folders, Sharepoint list, a web portal, or other network resource of one or more resource types. By using group memberships, rules may be quickly and conveniently configured and controlled by an IT manager for multiple users of an enterprise network.

Since control of mobile access resides in an application layer between the mobile device and existing security infrastructure, mobile access policies may be set for mobile users without overriding internal access or security policies. This approach enables mobile user access to resources that are not otherwise specifically designed to/intended to be accessed via a mobile device, if a mobile user has appropriate permissions, i.e., if access rules are met.

Thus, a method is provided by which existing resources, such as a path to a document on a file server, can be indexed and deemed accessible to an authenticated mobile user or device based on a user identifier, such as a user name and password, and associated information stored with an existing directory server, which may be a Microsoft Active Directory, Novell e directory, LDAP directory or other directory type.

The collection, displaying, and/or interfacing of information about resources on a computer network is enabled so that said resources maybe viewed, previewed, blocked, denied, interfaced or accessed by a mobile device in a secure and useable manner.

Users may securely view, email, fax, download and manage documents located in their office, including, for example documents in Novell™ or a contact in SharePoint™, directly from their Blackberry, smart phone or other mobile wireless handheld device. Thus, mobile professionals who need access to their documents and files from anywhere may be provided with full mobile document access to selected enterprise network resources, with appropriate enforcement of enterprise security policies.

BRIEF DESCRIPTION OF THE DRAWINGS

Embodiments of the invention will now be described in more detail with reference to the accompanying drawings, in which.

DETAILED DESCRIPTION

Figure 1:
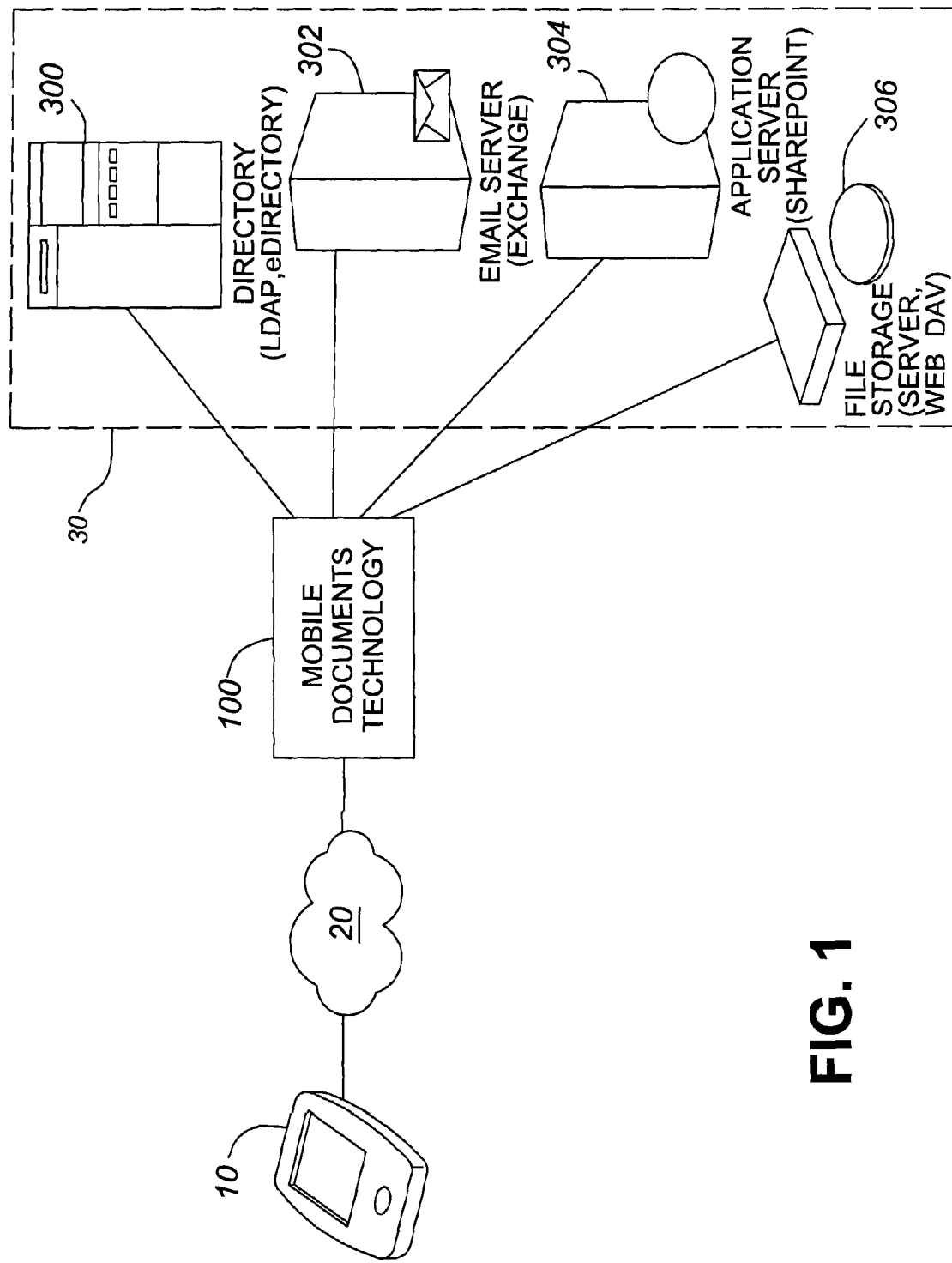
FIG. 1 illustrates schematically a simplified view of a network architecture, for implementing a system and method according to an embodiment of the present invention.

FIG. 1 illustrates schematically network architecture for a host network for implementing a system and method according to an embodiment of the present invention, for managing access to network resources 30 within the host network via a wireless network 20 from a wireless mobile device 10 of user 5. As shown in FIG. 1, in this embodiment, the host network comprises an enterprise network (intranet) that comprises a plurality of network resources 30 of different types, e.g., a Directory (e.g. an LDAP or eDirectory) 300; an email server (e.g. Exchange) 302; one or more application servers (e.g. SharePoint) 304; and File storage (servers, WebDAV) 306. Typically, such network resources 30 comprise, for example, documents and other files, such as a contact list, Exchange folders, a SharePoint list, a web portal, or other resources of one or more resource types to which a user would have access from within the host network in accordance with internal access policies or security policies, set by the network administrator. When working remotely, the user 5 may wish to have access to such resources from the wireless mobile device 10 such as a smart phone. In some scenarios, for business and security reasons, it may be desirable to restrict mobile user access to a subset of network resources that are available to a user from within the host network. Element 100 represents the WickSoft Mobile Documents technology, which provides a security model based on an access control layer between the enterprise network and the mobile device for managing access to the network resources 30 from the mobile device 10, and in this embodiment comprises middleware residing on a server within the enterprise network, and a corresponding client residing on a user's wireless handheld device, as will be described in more detail with reference to FIG. 2. In the system of the embodiment, access privileges for remote access by mobile devices are managed independently of, or separately from, internal security policies, and since they reside in a layer between the access server and the mobile device, they may be set up so as not to override internal network access policies, and for example, to restrict or deny mobile access to selected resources, as will be described in detail below.

Figure 2:
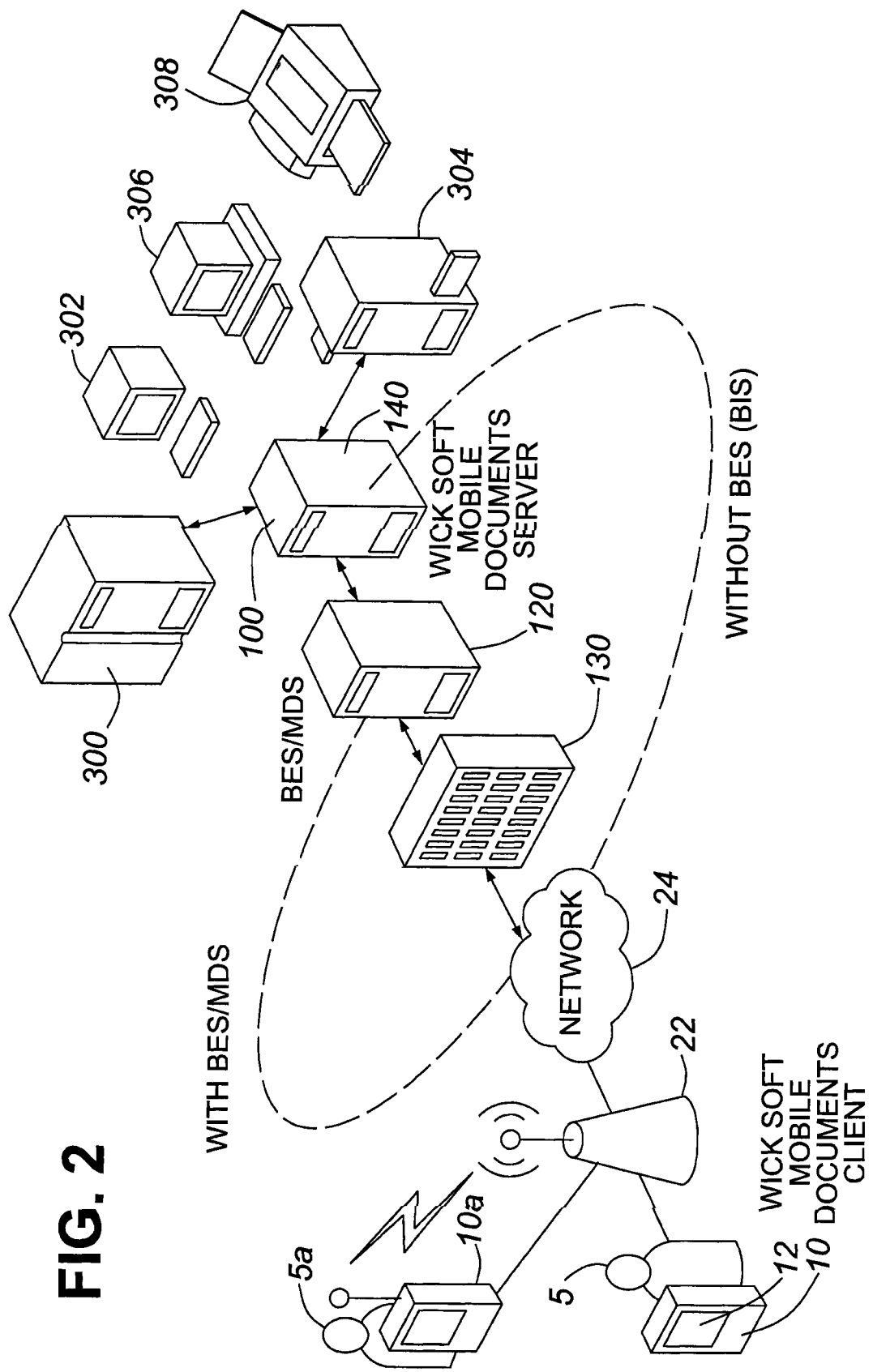
FIG. 2 illustrates schematically in more detail a network architecture, for implementing a system and method according to an embodiment of the present invention.

Systems and methods, according to embodiments of the invention, may be implemented to support mobile communication devices, such as smartphones, using various available mobile operating systems (OS). As illustrated in FIG. 2, the Wicksoft mobile documents server 100 may be implemented in a system with or without a Blackberry Enterprise Server (BES) 120.

By way of example only, an embodiment of a system and method is described in detail with reference to a system comprising a BES enabled host network, and a user having a Blackberry smart phone, running a Blackberry OS, for voice, email and other data communications. It will be apparent that systems and methods according to alternative embodiments, as shown, for example, in FIG. 1, or FIG. 8, without BES may be implemented to support smart phones and mobile devices using other mobile operating systems, such as iOS, Android, and others, that have been widely adopted.

FIG. 2 illustrates a typical implementation for a host network such as a corporate or enterprise network (intranet) comprising a Blackberry™ enabled enterprise network (intranet). The network illustrated in FIG. 2 comprises a Blackberry Enterprise Server (BES) 120, which is accessible, via a firewall 130, from the Internet 24. Located between the BES 120 and the other network resources 30 is another server 140, which will be called a Mobile Documents server 140. A plurality of wireless handhelds 10a, 10b, 10c, 10d, e.g. Blackberry Handhelds or other Blackberry Connectivity devices for respective users 5a, 5b, 5c, 5d, are connected to the internet 24 via a mobile wireless network 22, i.e. service provider wireless network for voice and data communications. When used in conjunction with a Blackberry Enterprise Server (BES) and Blackberry Mobile Data System™ (MDS), the Mobile Documents server 140 does not need to be accessible from the Internet or from other computers within the enterprise network. In other words, no additional ports or entry points need to be opened into the enterprise network for the Mobile Documents to function. Thus, this embodiment builds on and extends the inherent security built into the Blackberry infrastructure.

The Mobile Documents middleware 100 sits on the Mobile Documents server 140, and exists in a layer between the existing computer network resources 30 and the mobile handheld devices 10, 10a, et al. Mobile Documents client 12 resides on the user's wireless handheld device 10 or 10a. The directory server 300 may be a Microsoft Active Directory, Novell eDirectory, LDAP directory, or other type of directory. While typically an organization uses only one type of directory, and Mobile Documents application may be configured to support only one or two directory types. Beneficially Mobile Documents supports all common directory types, and provides for re-encoding required directory information into a common standardized format for subsequent processing.

This architecture provides for a system and a method by which an existing resource, such as a path to a document on a file server, can be deemed accessible by a mobile device according to Mobile Document access Rules (alternatively referred to as "terms", or "publishing rules", see below) based on information stored within an existing directory server 300. The access Rules describe who, what and how a mobile user may access or act from a mobile device. Rules can selectively block any network asset from mobile users. Also provided is a system and method by which an authenticated user of a mobile device is presented with a list of resources that exist within a computer network to which the user has access privileges via his mobile device, and allowable operations associated with each of the resources, which are deemed accessible. Operations may include, for example, one or more of read, write, execute, modify, and delete permissions, or variations thereof, including synchronizing accessible resources with the mobile device. Operations may also include determining if a particular resource should be included when searching for specific items (such as a contact), i.e. determining a sub set of resources to be selected or validated for, or otherwise passed to a subsequent operation. Thus, resources may be indexed to indicate whether they should be included in subsequent operations.

After installation of the middleware on server 140, Rules are established initially, and may be modified or updated as required by an IT administrator. The Rules are used to set permissions to implement a desired level of security policy for the enterprise organization, as will be described in more detail below. In preferred embodiments, Rules are established on the basis of membership of one or more groups (described below) which allows an administrator to initiate the system very rapidly even in large organizations with 100 s or 1000 s of employees.

In this context, a Rule describes WHO and WHAT and HOW for management of mobile access, i.e. which mobile user may access what resources, and associated actions or operations that may be taken from a mobile device. Each rule consists of two parts: 1. A membership list, 2. A resource and/or operations list 1. Membership Lists A membership lists contains criteria defining who may access the resources/operations described by the rule.

Tis membership list contains user ID, as well as security group memberships that correspond to security group memberships in an existing directory.

2. Resource/Operations Lists

Resource/Operations lists contain a list of resources described by the rule, along with other information about the resources (e.g. display name, resource type).

Operations describe actions that are permitted by the mobile user (such as Download a file, or email a file as an attachment).

High level descriptors are used to define membership lists and resources/operations lists.

For example: A rule can be any description of a user, a group of users, or some other criteria, e.g. {Sales People, Technical staff, Bob}

If the mobile user is Sales Person, Technical Staff, or Bob, this rule is satisfied.

A rule may contain a list of resources within a computer network, or a list of actions a mobile device may take, e.g. {C:\my documents, Z:, http://sharepoint.com/contacts} If the rule is satisfied, the list of resources described by the rule will be added to the list of references generated by the algorithm Rules (terms) declare that an action may or may not be performed, and may be positive or negative. That is, Rules may be "permissive" or positive i.e., define resources to be deemed accessible, and operations to be permitted. Some rules may be negative, i.e. "Deny" rules, in that "if Bob is using his PDA" then don't let him access this data.

Example Rule 1:

```
<Members>
    <user Bob>
    <user James>
    <group Sales>
</Members>
<Resources>
    <feature DownloadFiles = true>
    <resource \\FILESERVER\Legal\Forms\ name="My Forms"/>
</Resources>
```

Sample scenario: Bob's company has 36 workstations, 4 file servers, several contact lists, and SharePoint. In the office, John has bookmarks and logon scripts to give him access to these things. One of his file servers contains sensitive data that should not be accessible outside of the office. One of the contact lists contains information for all of his customers. Bob has a folder on a file server that contains pictures of his kids, and he likes having this handy. Using Mobile Documents, Bob would be presented with a list of 3 file servers, a folder for pictures, a contact list, and a SharePoint portal. The workstations and forbidden file server would not appear.

Example Rule 2:

```
<Members>
    <user value="John Smith"/>
    <group value="Administrators" op="or"/>
    <group value="Sales and Marketing" op="or"/>
    <group value="Authenticated Users" op="and"/>
</Members>
<Resources>
    <download value="true"/>
    <path value="C:\temp\"/ name="Temp items"
        type="folder" access="rwxmde"/>
    <path value="C:\%firstname%\"/ name="Z:"
        type="disk"/>
    <path value="http://sharepoint/site1/contacts" name="contacts"
        type="spcontacts" access="rwxmde"/>
    <path value=https://mailserver/exchange/ %mailboxname%"
        name="Mail" type="ex" access="rd"/>
    <path value="http://sharepoint/site1/clients" name="client contacts"
        type="spcontacts" access="rwxmde" SearchIndex=true/>
</Resources>
```

In this sample, if someone is in the Authenticated Users security group, AND the user John Smith, a member of the directory security groups Administrators, or a member of the security group Sales and Marketing, they are permitted to:

Download files from the resources specified.

Access the folder C:\temp, where he/she may read, write, execute, modify, delete and email the data within a folder.

Access the folder C:\% firstname %, where firstname will be substituted for the users first name (i.e. C:\John).

Access a SharePoint contact list where he/she may read, write, execute, modify, delete and email data within the list of contacts.

Access an Exchange mailbox, where the mailbox name is substituted for the user's mailbox name (i.e. https://mailserver/exchange/John. Smith@WICKSoft.com/) and may read or delete entries.

Perform a search for a contact from their mobile device, whereby the contact list "Clients" will be automatically indexed as part of the search operation.

An important feature of the Rules, in this embodiment, is that they allow specification of subsets of existing resources even within the same system. As an example, in SharePoint, each user may specify just one contact list for mobile access, even though a user may otherwise have access to 5 contact lists, which provides a level of granularity which is not presently available within SharePoint.

By default, access permissions may be set initially so as to block access to all resources from all mobile users. Rules may then be initiated by the IT administrator to selectively enable access to groups of mobile users according to appropriate access policies for each group (the Rules may alternatively be referred to as publishing rules). Unlike conventional access policies, in which access permissions for a specific user must be set for each specific resource, access Rules are preferably managed on the basis of group membership(s), to reduce administrative overhead for IT administrators, enabling much more rapid initial set up of the system.

Figure 3:
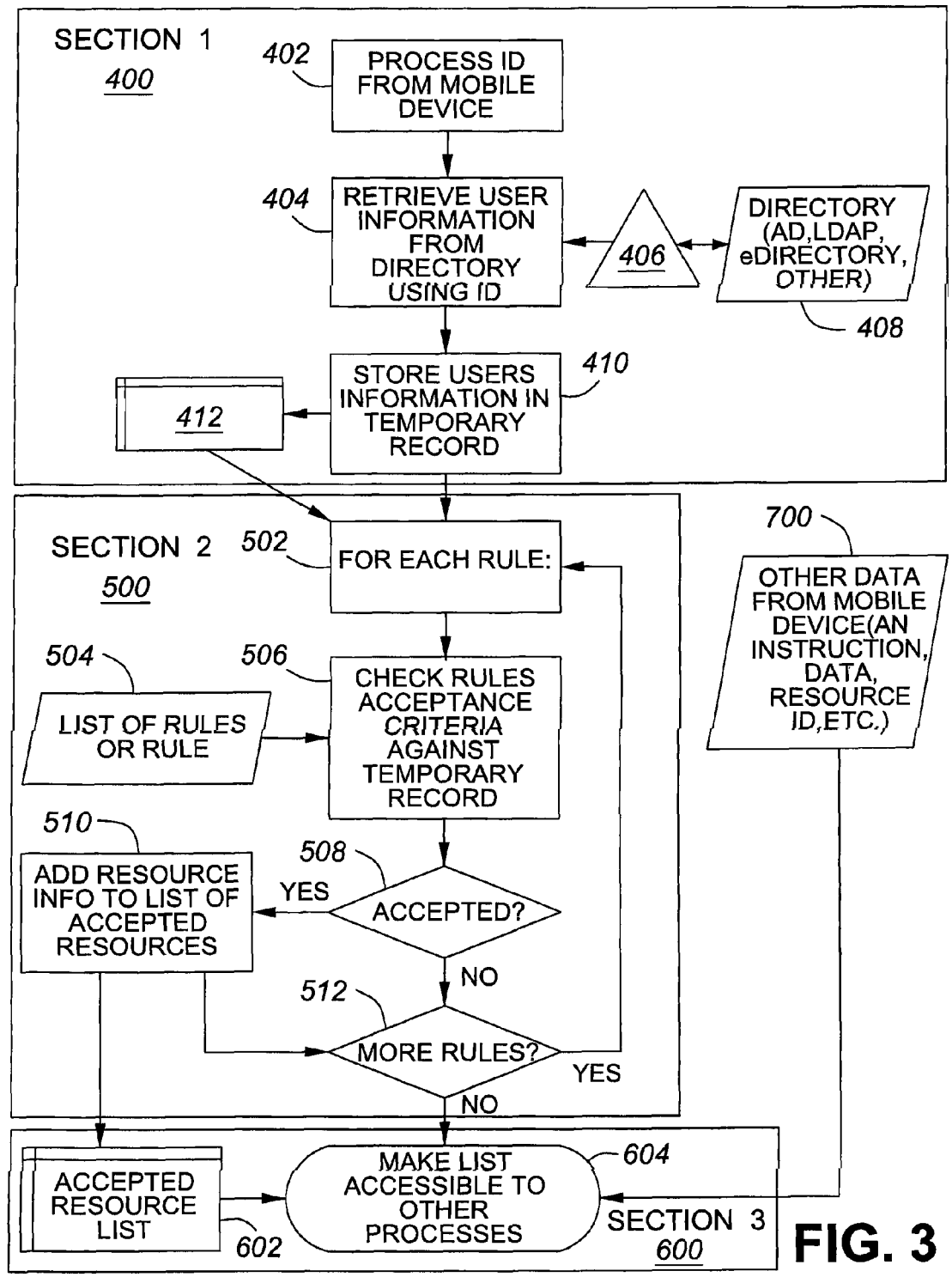
FIG. 3 illustrates an overview of steps in a method according to an embodiment.

Referring to FIG. 3, Section 1, to determine membership groups, the system stores, for look-up and retrieval, a set of criteria or attributes required to be associated with a user for acceptance for membership of each group 412, i.e. what attributes are required to secure membership of a particular group.

Also stored is a list of one or more Rules 504, which as explained above, may comprise membership lists providing high level descriptors of memberships, and resource and operations lists, providing high level descriptors of accessible resources and permitted operations associated with each resource.

Figure 7A:
FIGS. 7A and 7B illustrate schematically screen shots of a user interface on a mobile device showing steps in implementing a method of accessing network resources according to an embodiment of the present invention.

To access a list of available network resources stored on an enterprise network, a mobile user 5 launches Mobile Documents on the client 10 (handheld or mobile device), presents an identifier, and is authenticated, e.g. is presented with a logon screen and prompted for a user ID and password, which are sent to the Mobile Documents server (FIG. 7A). Optionally, authentication may be provided using a fingerprint, other biometric identifier, or other unique user ID and identifier using any other suitable known method, depending on the security level of authentication required.

Referring to FIG. 3, Section 1, the server accepts the identifier, i.e. User ID and password, and authenticates the user (step 402). If the user is authenticated, the user ID is used to associate the mobile device user with data stored in existing directories (408) (e.g. a Microsoft Active Directory, Novell eDirectory or LDAP director or other directory). That is, information is looked up and retrieved from the directory 408 based on the authenticated user ID at step 404 and information retrieved may include a list of attributes, such as first and last name, department, role or roles, status, authority level, or other user attributes, which are used to determine one or more group memberships of the mobile user. The attributes associated with each group membership are stored at 412. That is, system stores at 412, for look-up and retrieval, a set of criteria or attributes required to be associated with a user to secure (or qualify for) membership of each group.

Information retrieved from the directory is stored in a temporary record 410 as will be described further with reference to FIG. 4. When the user ID is received from the mobile device 402-1, the user ID is used to construct data that is used to query an existing directory 402-2. Although an enterprise typically uses one directory type, the Mobile Documents application preferably supports multiple directory types and the initial step 404-3 is a query for what type of directory. Once the directory type is determined, a query is then made to the directory 6 to obtain data associated with the user based on initial data obtained at step 402-2.

Since multiple directory types may be supported, if required at 406, the information retrieved from the directory is translated into a standardized or normalized format that is independent of directory type, for further processing. That is, data received from the directory is examined and re-encoded as required into a normalized format, and data elements are added to an internal list (temporary record) to compile a list of normalized user information. This data is stored in a temporary record at step 410. Stored at 412 is a list of attributes or acceptance criteria associated with each of a plurality of group memberships. Each group membership is also associated with a Rule defining a permitted set of resources, and associated actions or operations. Rules are stored at 504.

Referring to FIG. 3, Section 2, in steps 502 to 512, for each Rule or list of Rules 504, rules are checked against acceptance criteria for group membership 412, to determine if a user is accepted as a group member. If accepted as a group member, the associated list of resources for the group is added to a list of accepted or permitted resources, i.e. a list of descriptors of accepted resources and associated operations. If not accepted, the next rule is checked until all rules have been checked. The resulting list of descriptors comprises all accepted (permitted) resources for each of the groups that the user is accepted as a member. The list is used to generate the accepted resource list 602, which is then made accessible to other processes for subsequent operations.

Figure 4:
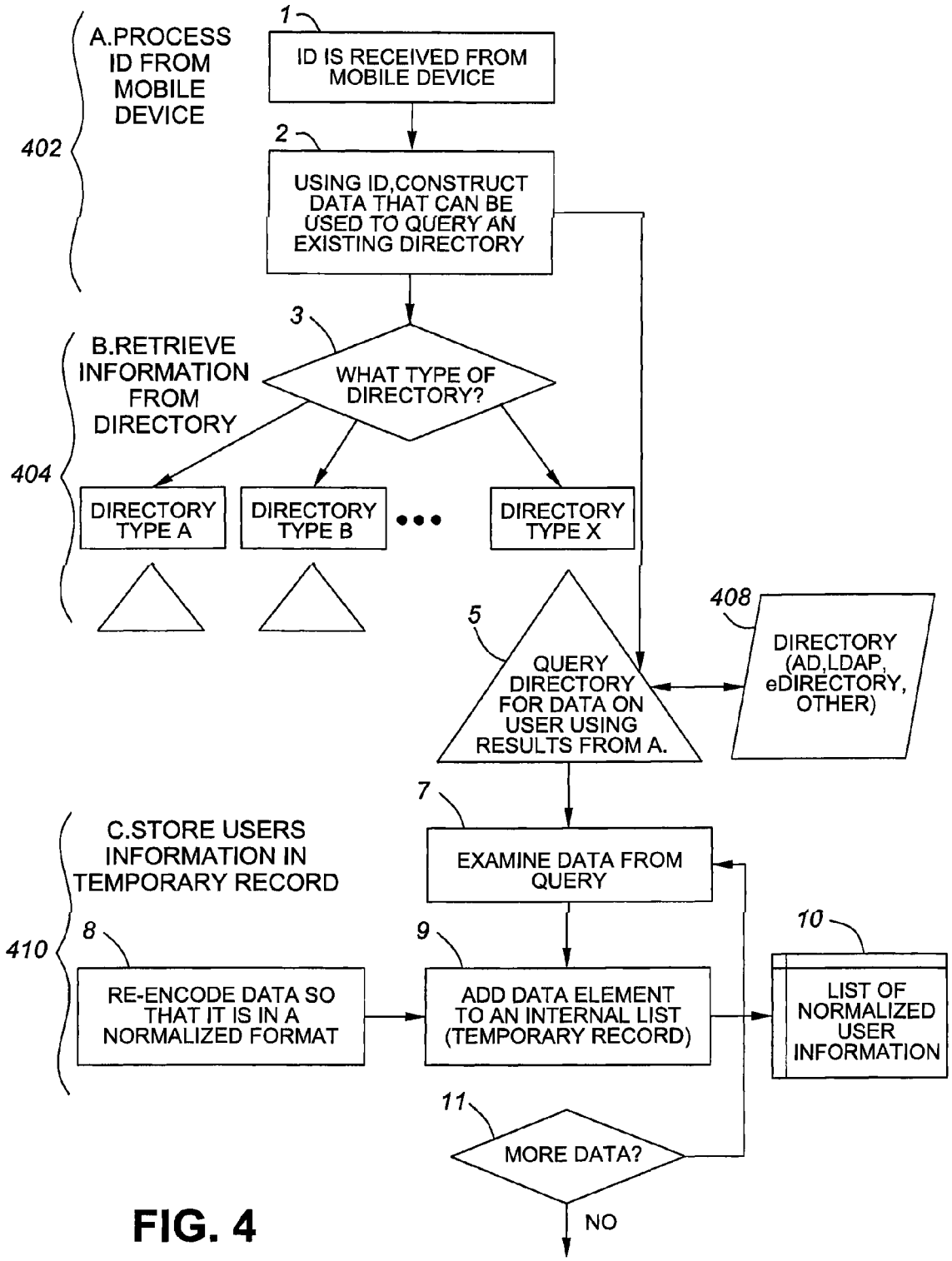
FIG. 4 illustrates in more detail the steps of section 1 of FIG. 3.
Figure 5:
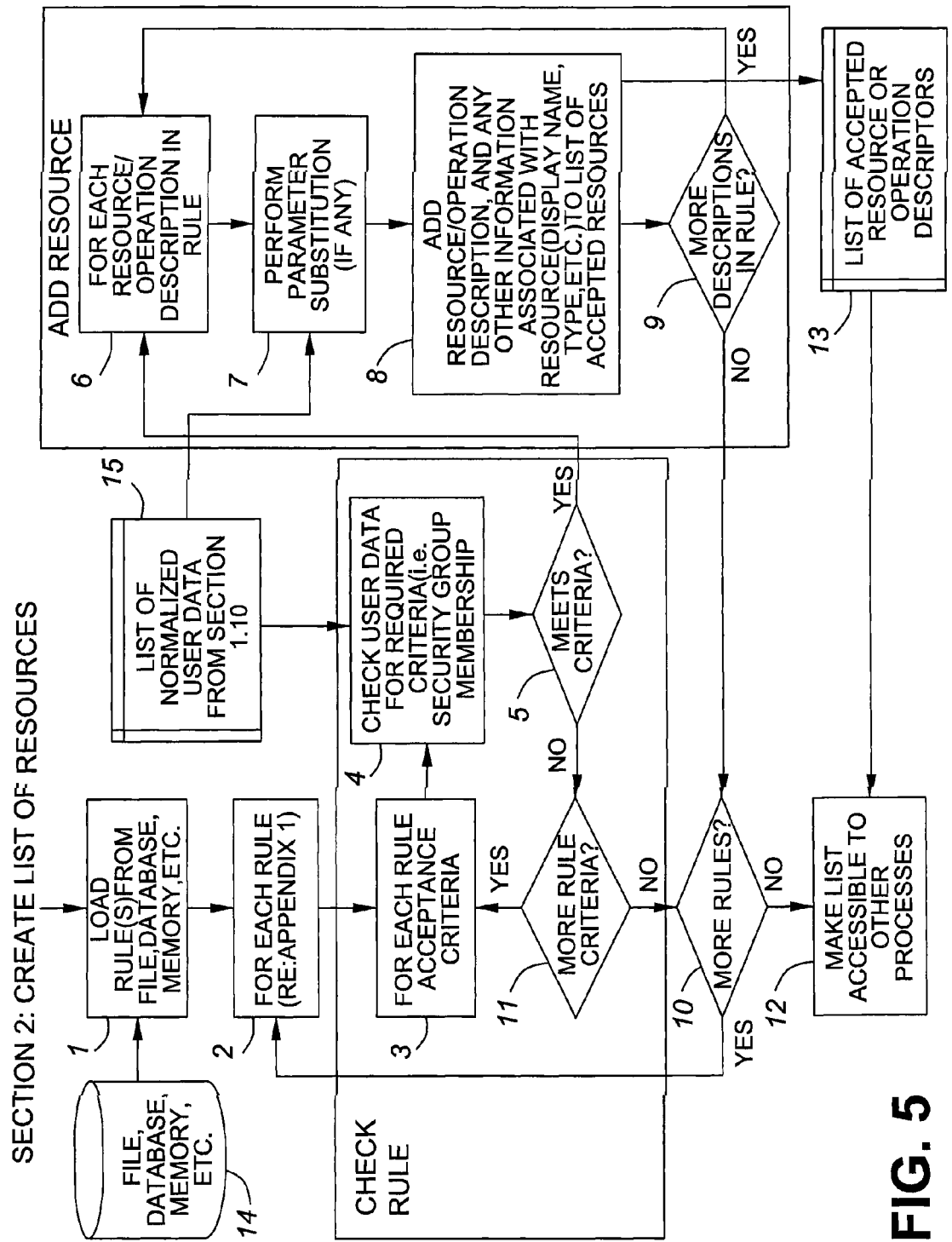
FIG. 5 illustrates in more detail the steps of section 2 of FIG. 3.
Figure 6:
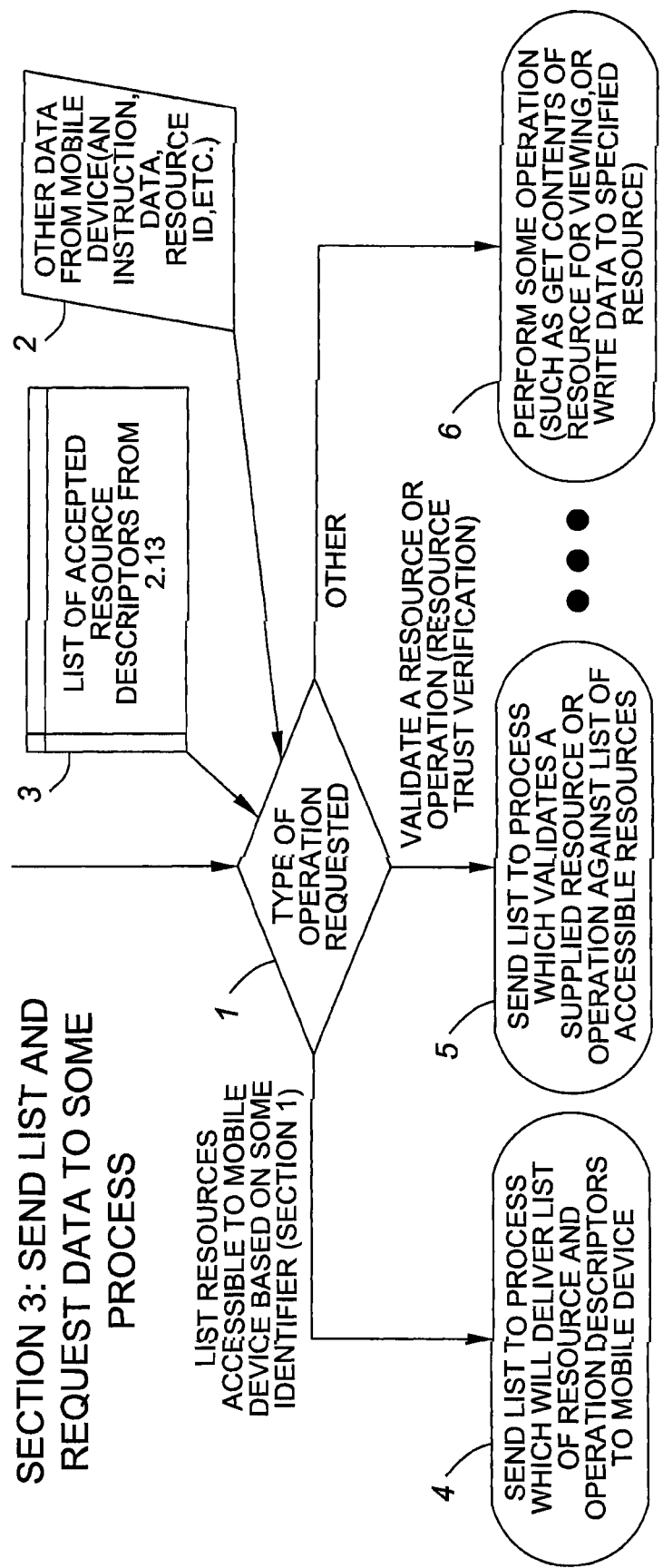
FIG. 6 illustrates in more detail the steps of section 3 of FIG. 3.

Referring to FIGS. 4, 5 and 6, for Sections 1, 2 and 3 respectively, these steps are shown in more detail. Information retrieved from the directory is compared to the set of Rules, which determine acceptance or denial criteria for a specific set of network resources.

Criteria may include, e.g.: Security group membership, Network user ID, Time of day, Location.

The set of network resources can be statically defined (C:\myfiles) or defined dynamically using data stored in the existing directory as parameters (C:\<firstname>.<lastname>\).

Network resources that have met the acceptance criteria are stored in a list e.g. [MOBILE LIST] as a set of references, e.g. paths to files, web site addresses, database locations, et al.

A Rule may also contain a directive which tells the mobile device a "friendly name" of the resource i.e., "C:\my documents\" should be displayed as "My documents".

This list may then be delivered to the mobile device, or optionally, used as acceptance or denial criteria when compared to another resource reference (e.g. the list says Bob has access to C:\my docs, and http://sharepoint. He is asking for C:\my does; is this okay?), or used as a list of places to search for a particular resource type If the response is positive, the list would then be delivered to the mobile or other calling operation. That is, a list may be used in another operation, such as search or verification, instead of, or before delivering it to the mobile device. Otherwise a message indicating the resource is not available, or other error message, may be delivered.

As shown in FIG. 1, resources 30 to which the user may desire access may include many different and diverse resource types, e.g. contact lists, shared calendars, Word documents, pdf documents, SharePoint, or others to which a user would typically have access to within the host network, in addition to email related resources. The set of rules defines a domain of allowable resources, and as mentioned above rules may allow for selection of only part of portal.

Optionally, rules may provide for an indication of resource type may be displayed with the listing of one or more resources, or a list of types of resources may be presented to the user for selection by the user.

Allowable operations or actions may be limited to viewing documents only. In some instances, it may be preferable to allow read access only, with no capability for downloading or storage of data on the mobile device. In other instances, other actions or operations may be desirable or permissible, and Rules may be set, e.g. so that editing or downloading of documents may be permitted. Beneficially synchronization of accessible resources, e.g. contacts or documents, with the mobile device may be permitted. For example, periodic synchronization permits a user to have up to date information on accessible resources or for stored information to be updated.

When determining group membership, i.e. whether an authenticated user is a member of a particular group, the criteria include user ID and at least one other attribute or additional data which is retrieved from the directory, in Section 1 of the process. Criteria may also include other data supplied by the user, from the mobile device or other information instruction, data, resource ID from other sources.

When each group membership for a user has been determined, access Rules for resources may require a Boolean evaluation or association of group memberships to determine the set of accessible resources and associated operations for the authenticated user. A user may have many different roles or identities which provide membership to many groups. As a simple example, a user may have membership of one group that provides read only access to a first resource, but may also have membership of another group that provides write access to the first resource and other permissions for other resources; the user may additionally have membership of a third group that restricts access to a subset of resources that may otherwise be accessible to the second group except for remote or mobile access from specific locations or at certain times.

Referring to FIG. 3, Section 3, optionally, other data from the mobile device, or the system, may be retrieved at step 402, or independently at step 700, e.g. an instruction, data, resource ID, et al. The data are made accessible, with the accepted resource list, to subsequent processes 604.

Figure 7B:

As an example, a list of resources may be presented to the user allowing the user to select a resource, or request an operation, or alternatively the interface may issue a prompt to the user for a selection or operation. As shown in FIG. 7B, a list of resources is presented to the user in the form of a menu. As is conventional, when a user right clicks on a selected resource a menu of permitted operations associated with the resource are presented such as view, download, edit, copy, etc. so that the user may select an action to initiate a subsequent process.

Optionally, the list of accessible resources may present an indication or description of a resource type along with a listing of the resource, for example by providing a path and a resource type, e.g. indicating, a resource is a Sharepoint portal, or is a contact list within Sharepoint.

Also optionally, the list of accessible resources may be used to determine where to look for certain types of information. For example, a mobile user may want to find all contacts from a specific company—the Rules would determine which resources contain contacts, and/or which of those the search should be conducted in. Thus, resources may be indexed not only by resource type indicator, but other criteria or indicators or descriptors, so that a list of a subset of accessible resources may be generated meeting particular criteria, e.g. in this example, a list of accessible resources of one or more contact list or types or sources for including in a contact search. Or, in performing an operation on a list of accessible resources, only those resources indexed with one or more specific indicators or descriptors may be included. For example, in the embodiment described above, a specific subset set of contacts list "Clients" may be indexed or tagged for mobile access, although the user may otherwise have access to several contact lists through SharePoint.

Referring to FIG. 6, a Resource Trust Verification (validation) step may optionally be implemented. This is a validation step that involves receiving at step 3-1a type of operation request, a list of accepted resource descriptors from 2.13, and if applicable, other data from the mobile device (e.g. an instruction, data, resource ID). In response to a request to list resources, a list of resources accessible to the mobile device based on some identifier in Section 1, may be sent directly to the process which delivers the list of resources and operation descriptors to the mobile device. In response to a request for another operation, an operation may be carried out, such as "get contents of the resource for viewing" or "write data to a specified resource". If required, automatically, or on user request, a Resource Trust Verification step may be carried out 3-5 where a list is sent to the process which validates a supplied resource and/or operation against a trusted list of accessible resources (whitelist). Alternatively the requested resource may be checked against an untrusted list (blacklist) and if there is a match the request may be refused, blocked, or an error message generated. During Resource Trust Verification, optionally a resource type or list of resource types may be displayed for selection or verification by the user, before access to the resource is provided.

Figure 8:
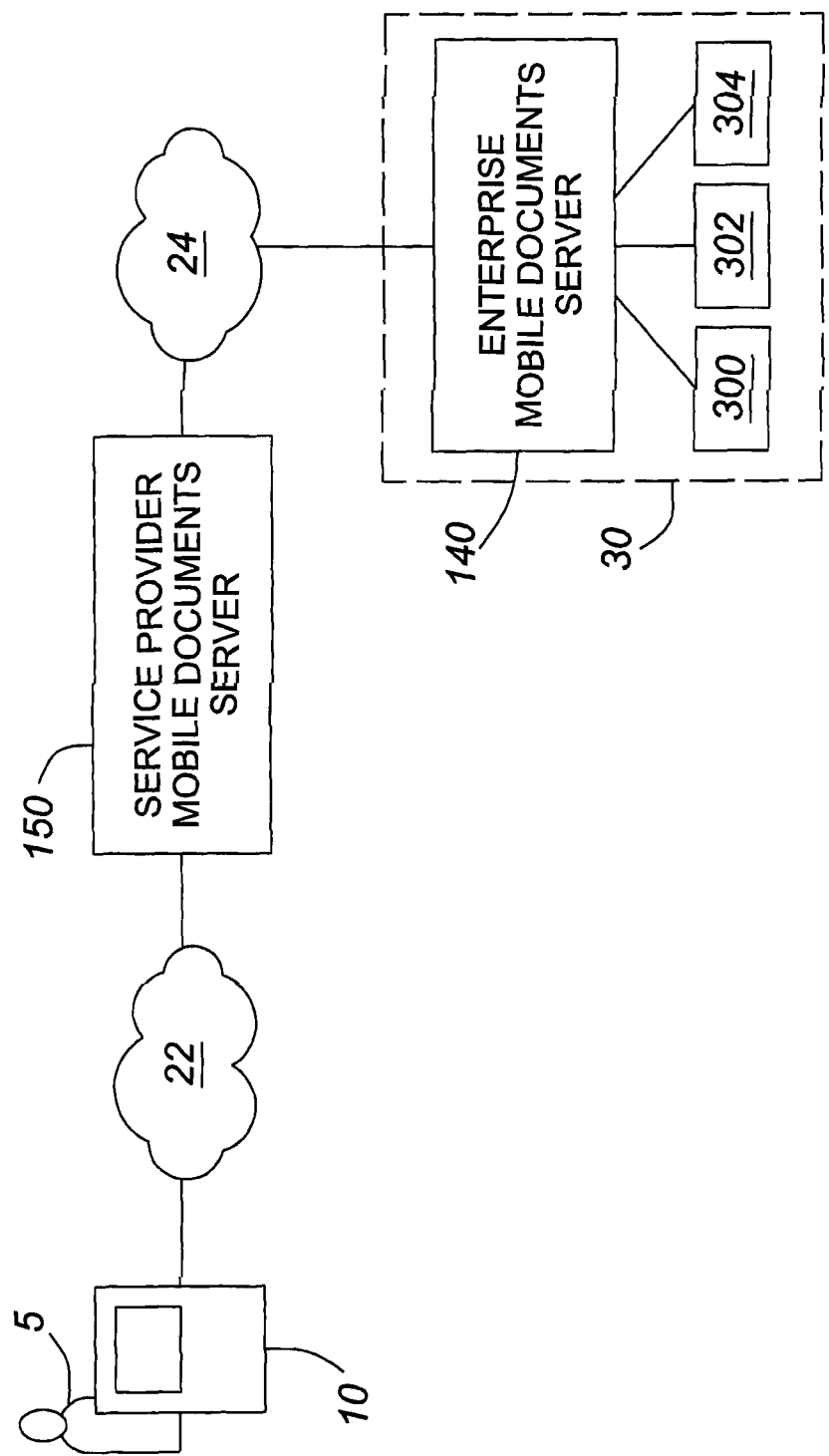
FIG. 8 illustrates schematically a network architecture for implementing a system and method according to another embodiment.

Although this embodiment is described for a system supporting a Blackberry device or a Blackberry connect enabled device, the system is compatible with mobile devices such as a Blackberry, iPhone or other smart phone or PDA, car computer or other mobile computer, using a mobile operating system. The mobile operating system may be for example, Blackberry OS™, iOS™ or Android™ and other available mobile operating systems, which normally connect via a service provider for wireless voice and/or data service, e.g. using a service provider cellular network or a WiFi network (e.g. 20 or 22 as illustrated in FIGS. 1, 2 and 8).

The system may also facilitate secure access to network resources of different types for wireless enabled laptops or mobile computers, i.e. using a wireless service provider connection such as a cellular network connection or WiFi connection, when a wired Internet connection is not available or is not convenient.

Beneficially, when synchronization of accessible resources with a mobile device is permitted, access to up to date information from accessible resources may be facilitated in case there is a network connection failure or service interruption. In an emergency management scenario, synchronization may permit emergency works to obtain periodic updates of information such as contacts, or emergency instructions, alerts, or contact information in other forms, availability of personnel to their mobile device.

For an organization without BES, Mobile Documents may be implemented on a Mobile Documents server within the enterprise network in conjunction with a service provider Blackberry server or other server. Alternatively, contract or outsourced personnel may benefit from the Mobile Documents solution via a web accessible server without requiring access to a BES within an enterprise network.

Mobile Documents service may alternatively be offered through a service provider which provides a common point of entry and would route to a customer's Mobile Documents server (FIG. 8). As illustrated, such a system may be configured with a service provider Mobile Documents server 150 and/or an enterprise Mobile Documents server 140 within the host network, to allow for mobile access via wireless service provider network 22 by users 5 of smartphones and other wireless mobile devices 10 running a respective Mobile Documents client. The client server system may be configured to support devices running standard mobile operating systems, such as iOS, Android and Blackberry OS.

In summary, the method
a. compares information
   i. sent from the mobile device
   ii. contained in a directory (such as an LDAP directory or database)
   iii. contained in Rules
b. and determines if a Rule has been satisfied positively or negatively.

Support for multiple directory types

Referring to FIG. 4, Section 1, although typically an organization will use only one directory type (e.g. a MAD, LDAP, eDirectory or other), the Mobile Document application is preferably enabled for multiple directory types, and in the initial step of retrieving information from the directory issues a query for what type of directory. After determining what type of directory, the directory is queried for data associated with the authenticated user ID, and data received from the directory in response. Data received from the directory from the previous step is examined, and re-encoded into a normalized format if required, and added to a list in the form of a temporary record. If there is more data, the additional data received is examined and re-encoded to create a list of normalized user information which are stored in a temporary record, comprising the user ID and other information received from the directory.

Check Rule

Rules are then retrieved from the file, database, or memory, etc, and then for each Rule a rule check is performed (i.e. rules are resolved), based on rule acceptance criteria (e.g. security group membership) received from the temporary record in the previous step.

For each rule acceptance criteria when the user data meets the required criteria, an add resource step is performed. For each resource/operation description in the rule a parameter substitution is performed if any, and then the resource/operation description and other information (display name, type, etc, to the list of accepted resources.) The check rule steps are repeated for each rule and rule acceptance criteria, thereby generating a list of accepted resources and/or operation descriptors. The list of accepted resources is then made available to other processes.

Resource Trust Verification

Referring to FIG. 6, Section 3, when a request for a resource n is received from the user, a response providing corresponding data (which may e.g. be a list, contents of a file or other information, e.g. a path to a file or other resource) associated with accessible resources is returned or is delivered to the mobile device.

On receiving subsequent user input from the mobile device for a specific resource or operation, a step of validation is performed. That is the list, resource descriptor and/or requested operation, is sent to a process that validates a supplied resource against a list of accessible resources. Optionally, information presented may include an indication or description of a resource type with a listing of a path or resource name. Alternatively, a listing of resource types may initially be presented to the user for selection or validation before presenting to the user a list of available resources of the selected type.

Additionally or alternatively in response to an operation request, the request may be sent to any other process which may require a list of accessible resources and operations.

Thus, security encompasses steps of authentication, application of security policy, publishing of the Rule or Rules, application of other security policies, e.g. windows policies and checking with respect to a Windows access control list.

Based on the Rules (terms) a resource may be displayed, interfaced, blocked, denied to a user or users.

Groups Definitions

Multiple Rules (terms) or a collection of Rules (terms) may need to be satisfied before a resource or collection of resources that may have been explicitly stated or stated as a result of the evaluation of a term can either be displayed, allowed, blocked, etc.

Multilayer Security

By using the BES, or an existing VPN, with Enterprise activated handhelds a secure connection is already present.

Since the Mobile Documents server does not need to be accessible from the Internet or even internal computers, it is possible to restrict the point of entry to verified assets (e.g. authorized Enterprise activated handhelds). This is similar to restricting an IPSEC VPN to a specific MAC address, only with a higher level of obfuscation.

Preferably, instructions between the Mobile Documents client, running on the Blackberry handheld, and the Mobile Documents server that resides in the intranet, are transmitted by a proprietary communications protocol that provides no mechanism to execute remote programs or manipulate a database, and can only convey simple end user operations such as "list the contents of a folder".

These different levels of security contribute to thwarting external threats that attempt to monitor, intercept or modify data communicated between the handheld and the intranet.

The cryptographic layers protect network traffic all the way from the internal Mobile Documents server out to the hand held device.

Using this security protocol provides the following benefits: Existing security resources, such as content scanners, MDS, Microsoft ISA; Server, and other Firewall products continue to take effect; Deployment requirements—and therefore the security impact—are reduced because the protocol tunnels through standard HTTPS. The limited scope of the Mobile Documents™ protocol makes it almost impossible for a standard Windows worm (like an SQL injection exploit) or Trojan to propagate through the system. If upload of information is not required, the protocol may be made exclusive to Mobile Documents™—in other words, other applications cannot use the protocol. The system is highly resistant to tunneling efforts, such as running a torrent, remote desktop application, or some other network utility across the same protocol. For example, an end user could not setup a program like VNC within the Intranet and then use the system to access VNC, thus circumventing security measures. Such a protocol will not facilitate tunneling or hijacking by other applications.

This protocol is highly conducive to policy enforcement. In this way WICKSoft Mobile Documents™ provides additional layers of security, which will be discussed later, that are context and content sensitive.

Application Level Security

All data that moves through the system goes through the same set of checks and balances before being passed on to the internal network. Only after these checks and balances have been satisfied will a given operation be performed on the internal network.

Authentication

The first check is authentication. Preferably, all users must login using their identification for each and every operation before being processed. After authentication by the Mobile Documents™ server a, all processes within Mobile Documents™ are undertaken as if the user were logged in to the local network as that user. If an account is disabled or modified in Active Directory, or Novell eDirectory, then the changes will be reflected in real-time. Requests will be allowed or rejected by both Mobile Documents™ and the Operating System based on current directory information.

Security Policy

The second check is against the access rules, which restrict access to specific resources, and set security policy for mobile access. As described above, access permissions are determined by access rules associated with user group membership which are specifically designed for remote access applications. Access Rules can be customized to restrict access by users and groups to:

Machines
Shares
Files and Folders
Web resources
File types

Additionally, all requests must pass a sanity test, (e.g. to exclude unacceptable resource descriptors or to test that a minimum set of requirements is met) which guard against certain intrusion attempts.

Publishing Rule

The third check is made with respect to publishing rules. Administrators must explicitly allow network resources to be made available to end users. In this way the risk of accidentally exposing sensitive resources is mitigated. Keep in mind that internal security policies (mentioned earlier) override publishing rules, mistakenly providing access to an otherwise explicitly denied resource (or user) will not compromise the system.

Windows and Novell Security Policies

Once a user logs in to Mobile Documents™ they are subject to all of the security constraints implemented at the Intranet level. In this way a Microsoft Security. Policy will affect and constrain a Mobile Documents™ user as if the user were accessing the Intranet locally.

Windows and Novell ACLs

At no point will Mobile Documents grant a user access to something they do not have sufficient rights to access. Mobile Documents™ honors all Microsoft Windows and Novell ACLs at both the share and folder level. These ACL (Access Control List) checks ensure that the end user will not be able to do something that they couldn't otherwise do from the office.

Application Layer Security Summary

The application security layer, with its multiple checks and balances, makes it very easy to lock down the mobile enterprise. Basic built-in sanity checks which cannot be overridden, ensure that relative path referencing, local paths, and certain other aberrant access types are not permitted to flow throughout the rest of the system. A failure at any one point along the sequence immediately invalidates a client request and is logged to a special security log. The entire secure channel ultimately provides a level of data and application control that facilitates only the operation of Mobile Documents™, but no other applications.

Handheld Level Security

The Blackberry Wireless Handheld is provides an inherently secure operating environment and Mobile Documents leverages and enhances this inherent security.

Mobile Documents provides the following security features on Blackberry and other handhelds:

File downloading is disabled by default. If administrators choose to enable downloading in both the server-wide security policy, and specific publishing rules, then clients may store information on their PDA. Security policies and publishing rules can restrict downloading to documents deemed safe for transfer to a PDA.

Unless downloading is enabled, at no time is sensitive data ever stored on the handheld, a SIM card, or other portable storage device.

All e-mail messages sent using Mobile Documents are sent from within the corporate intranet, and do not travel over the air. When used in conjunction with Microsoft Exchange, Mobile Documents acts as if the user sent an email message from their desk, even leaving a copy of the outgoing message in the user's 'Sent Items'.

Mobile Documents honors the automatic lock-out during periods of inactivity that is provided by the mobile device.

Mobile Document provides an independent automatic lockout so that Mobile Document will become locked after a period of inactivity.

Optionally, transfer of data from an external source can be restricted or disabled. This provides immunity to Bluetooth born viruses and worms, and protects against MIDP and handheld based Trojans.

Security Model

Security is approached from three distinct levels. The first is the data transfer level, the second is the application level, and the third is the handheld level.

Data transfer level: traffic may be susceptible to monitoring, and where worms, viruses, and attackers may attempt to gain a remote point of entry, ensure that a secure tunnel is created and maintained from the handheld directly to the Enterprise.

Application level security: a policy based approach to ensure sensitive date never leaves the office and that only operation deemed "safe" from a mobile device are possible. Mobile VPN technology must ensure that users cannot accidentally distribute, remove or otherwise tamper with sensitive information and other network resources.

Handheld level: the mobile VPN must be able to effect changes immediately, even if the handheld is turned off. This provision is necessary to ensure that stolen or misplaced assets can be disabled immediately, and sensitive information is not left behind.

These three levels provide a secure channel between the Blackberry and the Intranet, and a secure platform through which to operate.

Multilayer security access features mean that access can be restricted to any network resources, for any use, be it Novell, SharePoint, Windows, or some other document management system Emails sent using Mobile Documents are routed internally, just as if they were sent from a desktop sitting in the office.

Existing security infrastructure, like content scanners, and ACLs will also work with Mobile Documents.

Thus, systems and methods according to embodiments of the present invention are provided that delivers a secure channel to the enterprise network that facilitates mobile document access while reducing risk of exposure of the corporate network to external threats. Enterprise security management features allow administrators to control mobile user access to network resources.

Advantageously, extensive logging allows for continuous auditing of many aspects of deployment. Full access traces and security notification permit the administrator to closely monitor activity.

By leveraging existing infrastructure, embodiments of the invention can integrate seamlessly with the mobile enterprise while providing an enhanced level of security and access control. If required, rules may be implemented so that sensitive data is never stored on the handheld, and data transfers (such as file management, and e-mail attachments) do not travel over-the-air. Existing security infrastructure is applied to the mobile user.

A proprietary protocol ensures existing security threats, such as worms and viruses, do not hijack or tunnel through the secure Mobile Documents™ channel. Mobile Documents allows mobile users to securely view, email, fax, download and manage documents located in SharePoint, Novell Teaming+Conferencing, both Microsoft and Novell File servers, WebDAV, and document management systems. Thus, much of the functionality of the desktop is transferred over to the handheld.

Resources of many different types may be supported and interfaced to the mobile user's device, for example:

MS Sharepoint Lists
Novell Teaming+Conferencing
ACOM
Exchange, Exchange Public Folders, Exchange Delegate Folders
WebDAV
Many EDM and DMS Other capabilities, for example, include mobile access to third party web portals, e.g. Paper IQ, by passing credentials from a handheld to the Paper IQ server, or other hosted webserver.

Example: SharePoint Integration

Beneficially, this integration of multiple resource types enables a mobile user to perform many operations that were not previously available to mobile users. For example, SharePoint provides a document repository, process workflow, collaboration. A user may send someone an email containing a link to a file from an application such as SharePoint, permitting the recipient to click on the link in his or her Blackberry email, and open the document up almost instantly. The user may access almost any list in SharePoint and navigate and search through contacts, access attachments and document libraries.

Nothing is cached or replicated so mobile users always have access to the most up to date information in SharePoint.

Whether using a SharePoint application or other applications/environments, documents may be emailed as attachments, or with links to allow download of files for editing on the phone or on a laptop, copying files to other servers internally, and collaborating with co-workers regardless of location. Preferably, full fidelity document viewing provides for fonts, charts, graphics, and spreadsheets to appear as they would from a PC.

As other examples, rules may similarly be established to allow a mobile user to perform many other tasks from a Blackberry or other smart phone, such as:

Access links to documents in email, just like on a desktop.
Access SharePoint documents directly and securely.
Access Exchange Public or Delegate folders.
Search an Exchange inbox for an older item.
Access files on a network file server (e.g. U:, T:, Z: or and other common network drives).
Use Novell's newest collaboration tool, Novell and Teaming+Conferencing.
View documents in full fidelity, just like on a desktop.
View an attachment to a meeting in an Exchange folder.
Mobile access to ACOM's EZContent Manager to manage, download, fax email and view enterprise documents.

Beneficially, the Mobile Documents middleware may be installed and operated without changes to Domain controllers, eDirectory, or BES. Existing users, groups, policies remain intact without any modification.

File transfer is not restricted to file type, e.g. may be adapted to work with many common file types: pdf, MS Word, Excel, Powerpoint, Wordpad, rtf, jpeg, and other known file types.

Download of files is preferably and, optionally, enabled by an administrator. Editing may be provided through third party applications. If files are downloaded they may be transferred and edited on a laptop or desktop.

Mobile Documents Server does not require a dedicated server, and may run in virtual environments. For example, the Mobile Documents middleware may reside on the BES or on a separate server. Multiple Mobile Documents servers may be provided for load sharing and load balancing. The server hosting Mobile Documents may be located almost anywhere in the network. Multiserver mode, load balancing, geographic data routing and fail safe redundancy are supported.

Other features:

Containers

Rules allow administrators to set rules base on Boolean evaluation or associations of group memberships (e.g. Bob is a member of Group A AND (Group B OR Group C); Bob is a member of Group A AND NOT Group C. Accessible resources may be displayed in containers including resources associated with membership of a particular group, e.g. so that a user is aware of which resources other members of the same group can see or otherwise access.

Tokens

If, for example, a user has multiple IDs, an ID token may be used to indicate the type of authentication and a resource may include information describing what kind of ID is required to access a resource, or perform an operation or action. ID Tokens may require credentials from another source, and be managed from a central source.

Proprietary Protocol

To manage access to multiple types of resources, the protocol for communicating resource information between the client and server must be robust enough to define many different types of resources in a standardized format. For example, some resources have a hierarchical file system, whereas a database may have a relational data structure. Consequently, the protocol provides a way of representing different types of resources in a common format for transmission of information between the server and the device. It is translated into a common language, and presentation of information to the user through an appropriate user interface on the mobile handheld device. For example, the interface may display information such as a resource description, a name to be displayed, what picture to display, and actions, i.e. what can be done with the resource.

Resource Trust Verification

Every resource, no matter how it is accessed is put through a strict set of checks to help prevent fraud, enforce corporate and legal policy. This validation step reduces risk of phishing and other malicious activities The user ID and link information are checked to see if the link is an allowed resource and if the resource resides on a trusted list. In response, a yes/no decision is made to determine if the resource may be shown and/or accessed. For example, a response may be sent to the requestor to indicate whether or not the resource is on a trusted list, allowing the user to select the next action, or if the resource is on a trusted list, the resource may be displayed or requested information sent directly to the requestor.

Since management of security is focused in the server and through section 2 Rules, there is no need for a security audit for each and no need for knowledge of each application.

Multiple Resource Types

While the embodiment described above provides a comprehensive range of features supporting multiple directory types and multiple resources types, in some applications a simplified version for accessing a subset of resources or only one directory type may be acceptable. However, advantageously, support is provided for multiple resource types, overcoming limitations of alternative solutions, which support only one type of resource, e.g. Windows file servers, but which cannot support other resource types.

Multiple Directory Types

Although most organizations use only one directory type, preferably, multiple types of directories are supported, and an initial step queries for a directory type, and then provides for translation of directory information into a common standardized format. Thus, one version of the application may be implemented universally for most common directory types.

Access Rules

Mobile Documents defines rules for access and for actions with respect to each type of resource or subset of resources. Rules may be set dependent on other data such as location (e.g. from GPS) and/or time of day (local time or server time) received from the server, or mobile device or other sources. Thus, rules may be dynamically determined. As mentioned above, any changes to user group memberships, or other attributes stored in a directory are applied in real time. Where synchronization is enabled, or is a permitted operation, up to date information may be exchanged with the mobile device to ensure a user has access to current documents, contacts, or other information. Thus, if a resource is temporarily unavailable, a user has a recently updated copy of the information on the mobile.

While the term "user" in the above description refers to a person, the user may more generally be any entity such as an individual or a device, for example identified by a unique profile or description of a device, a geographic location, or a temporal descriptor.

A mobile device may be any communication device, such as laptop with wireless connection, PDA, Blackberry, or for example a car computer or other communications device in a vehicle, or other managed corporate resource.

In a multi-domain environment, beneficially an access or publishing rule may include a network identifier associated with a network resource to indicate which network domain a resource belongs to. An identification or authentication token may also be used since a user authenticated in one domain may require re-authentication in another domain.

Mobile documents is not capable of overriding existing network security, so all of Windows, Novell and SharePoint ACLs will still take effect.

INDUSTRIAL APPLICABILITY

A scalable and flexible solution is provided comprising a system and method for managing mobile access to network resources such as documents, lists and other files on a host network, e.g. an enterprise network. Users may securely view, email, fax, download, modify and upload, or otherwise manage documents located in their office, including documents in Novell and SharePoint, directly from their smart phone or other mobile wireless handheld device.

Thus, mobile professionals, travellers, emergency workers, who need access to their documents and files from anywhere are provided with full mobile document access.

Users may have access to all documents as if they were sitting in their office. Alternatively, for business or security reasons, network or IT administrators may restrict access to allow access to only a subset of resources for mobile users.

Administrators have extensive control over an organization's mobile environments, and the system is easily and rapidly deployed. Two factor encryption and multilayered policy based security models, application level access control, directory integration and enterprise security management may be provided.

Although embodiments of the invention have been described and illustrated in detail, it is to be clearly understood that the same are by way of illustration and example only and not to be taken by way of limitation, the scope of the present invention being limited only by the appended claims.

The invention claimed is:

1. A method for managing secure mobile user access from a wireless mobile device via a wireless service provider network to a plurality of network resources of a host network, by steps comprising:
   in an access server comprising a mobile access control layer between the wireless service provider network and the host network,
   receiving, from a client of the wireless mobile device, a user request for mobile access;
   authenticating the user;
   determining group membership of the user based on a user ID and attributes of the user, each group having associated therewith a set of resources and associated operations for members of the group;
   determining access rules for the user based on each group membership of the user;
   generating a list of accessible resources and associated operations for the user based on said access rules;
   making said list available to a subsequent process for performing an operation on an accessible resource in accordance with said access rules, said operations on an accessible resource comprising one or more of displaying and otherwise interfacing said resource to the user for one or more of read, write, execute, modify, delete, email, download and synchronize operations.

2. A method according to claim 1, further comprising performing an operation on an accessible resource comprising one or more of displaying and otherwise interfacing said resource to the user for one or more of read, write, execute, modify, delete, email, download and synchronize operations.

3. A method according to claim 1, wherein said network resources comprise network resources of different resource types, and comprising generating said list of accessible resources and operations for the user comprising accessible resources of a plurality of different resource types.

4. A method according to claim 1, wherein the step of authenticating the user comprises receiving from a user credentials comprising at least the user ID.

5. A method according to claim 4, further comprising retrieving directory information associated with said user ID to obtain attributes of the user associated with said user ID.

6. A method according to claim 5, further comprising before retrieving directory information, determining an applicable directory type of a set of possible directory types, and after retrieving said directory information, re-encoding said information to a desired format.

7. A method according to claim 1, further comprising delivery of the list of accessible resources and operations to the client of the wireless mobile device.

8. A method according to claim 7, wherein delivery of the list of accessible resources and operations comprises presenting the list of accessible resources and operations to the user via a user interface of the wireless mobile device.

9. A method according to claim 8, further comprising presenting a list of accessible resource types, and receiving a user selection or validation of a resource type before presenting the list of accessible resource and operations.

10. A method according to claim 8, wherein presenting the list of accessible resources and operations comprises presenting an indication or description of a resource type associated with an accessible resource.

11. A method according to claim 8, wherein presenting comprises graphically displaying said list on the mobile device.

12. A method according claim 1, further comprising validating one or more of an accessible resource, operation, or resource type before subsequent processing thereof.

13. A method according to claim 1, further comprising a step of validating an accessible resource and/or operation in response to a user request before subsequent processing thereof.

14. A method according to claim 1, further comprising initiating a process to respond to a user request for an operation on an accessible resource in accordance with access rules.

15. A method according to claim 14, further comprising responding to a request from the user for an operation on a resource by blocking or denying access to said resource.

16. A method according to claim 1, wherein said access rules are determined for a user based on a Boolean evaluation of rules for a plurality of group memberships of the user.

17. A method according to claim 1, further comprising receiving additional data from at least one of the host network and the mobile device, said additional data comprising at least one of directory data, user data, a time, a date, a location, a resource ID, a selected operation; and an instruction and wherein said access rules are further determined based on said additional data.

18. A method according to claim 1, wherein said access rules are determined dynamically based on at least one of a date and time of day and a location of the mobile device or a combination thereof.

19. A method according to claim 1, wherein each access rule comprises a membership list and a resource and/or operations list.

20. A method according to claim 19, wherein a membership list comprises a high level descriptor defining criteria for who may access associated resources and operations.

21. A method according to claim 19, wherein a resource and/or operations list comprises high level descriptors of resources and/or operations.

22. A method according to claim 1, wherein said access rule comprises a high level descriptor of one or more of a membership group, a resource, and an associated operation.

23. A method according to claim 1, further comprising determining group membership of a user based on a token associated with said user ID.

24. A method according to claim 8, wherein presenting said list of accessible resources and operations comprises displaying said list arranged by containers, each container containing a listing of resources and/or operations associated with a respective group membership.

25. A method according to claim 8, wherein presenting said list of accessible resources and operations comprises displaying said list arranged by resource type.

26. A non-transitory computer readable storage medium storing instructions for execution by a processor of an access server comprising a mobile access control layer between a wireless service provider and a host network, to perform the steps of:
   receiving, from a client of the wireless mobile device, a user request for mobile access;
   authenticating the user;
   determining group membership of the user based on a user ID and attributes of the user, each group having associated therewith a set of resources and associated operations for members of the group;
   determining access rules for the user based on each group membership of the user;
   generating a list of accessible resources and associated operations for the user based on said access rules;
   making said list available to a subsequent process for performing an operation on an accessible resource in accordance with said access rules, said operations on an accessible resource comprising one or more of displaying and otherwise interfacing said resource to the user for one or more of read, write, execute, modify, delete, email, download and synchronize operations.

27. A client-server system for managing secure mobile user access from a wireless mobile device via a wireless service provider network to a plurality of network resources of a host network, the system comprising:
   an access server providing a mobile access control layer between the wireless service provider network and the host network;
   a mobile access client residing on the user's wireless mobile device; and
   wherein the mobile access control layer is configured to perform the steps of:
   receiving, from the mobile access client, a user request for mobile access;
   authenticating the user;
   determining group membership of a user based on a user ID and attributes of the user, each group having associated therewith a set of resources and associated operations for members of the group;
   determining access rules for the user based on each group membership of the user;
   generating a list of accessible resources and associated operations for the user based on said access rules;
   making said list available to a subsequent process for performing an operation on an accessible resource in accordance with said access rules.

28. A client-server system according to claim 27, wherein the mobile access control layer is further configured to perform the step of delivering the list of accessible resources and operations to the mobile access client.

29. A client-server system according to claim 27, wherein the mobile access client is further configured to:

perform the step of presenting on a user interface of the wireless mobile device, said list of accessible resources of one or more resource types and permissible operations; and to receive a user request for performing a selected operation on a selected accessible resource.

30. A client-server system according to claim 27 configured for operation with a wireless mobile device comprising one of a Blackberry device, an iPhone or other smart phone running a mobile operating system comprising one of Blackberry OS, iOS, Android or other mobile operating system.

31. A client-server system according to claim 27, wherein the wireless service provider network comprises a cellular voice and data network.

32. A client-server system according to claim 27, wherein the wireless service provider network comprises WiFi network.

33. A client-server system according to claim 27, wherein the mobile access control layer determines accessible resources and permissible operations based on information received from the mobile device, information contained in a directory and information contained in rules, and determines if a rule has been satisfied positively or negatively.

34. A client-server system according to claim 27, wherein access privileges for remote access by mobile devices are managed independently of, or separately from, internal security policies of the host network.

35. A client-system according to claim 27, wherein mobile access is restricted to a subset of resources accessible to a user internally within the host network, so as not to override internal network access policies, and to restrict or deny mobile access to selected resources that would be available to said user according to internal network access policies.

36. A client-system according to claim 27, wherein said access rules provide for specification of subsets of existing resources within the same system.

37. A client server system according to claim 26, configured such that permissions are set initially so as to block access to all resources from all mobile users, and wherein said access rules are established to selectively enable access to groups of mobile users according to respective access policies for users based on membership of each group.

* * * * *